United States Patent

[11] 3,587,331

| [72] | Inventor | Jack W. Moss<br>Wichita Falls, Tex. |
|---|---|---|
| [21] | Appl. No. | 824,828 |
| [22] | Filed | May 15, 1969 |
| [45] | Patented | June 28, 1971 |
| [73] | Assignee | Wichita Clutch Company, Inc.<br>Wichita Falls, Tex. |

[54] POWER TAKEOFF WITH SHAFT FREE OF RADIAL LOAD
2 Claims, 5 Drawing Figs.

[52] U.S. Cl. .................................................... 74/11, 64/9,
74/606
[51] Int. Cl. .................................................... F16h 37/00,
F16h 57/02, F16d 3/18
[50] Field of Search .......................................... 74/606, 11,
15.63, 15.6, 15.66, 15.69; 180/53; 64/9

[56] References Cited
UNITED STATES PATENTS

| 2,116,739 | 5/1938 | Eason | 74/15.63X |
| 2,667,048 | 1/1954 | Whitfield | 64/4 |
| 3,058,556 | 10/1962 | Marland | 64/9X |
| 3,290,897 | 12/1966 | Kuehn | 64/9X |
| 3,298,199 | 1/1967 | Grey | 64/9 |

*Primary Examiner*—Leonard H. Gerin
*Attorney*—Wayland D. Keith

ABSTRACT: A power takeoff including an outwardly extending shaft, an elongated rotatable member, such as a sheave supported in journaled relation on the exterior of a housing to prevent a radial load from being transmitted to the shaft thereby to enable a greater torque to be transmitted to an elongated rotatable member, such as a multigroove pulley or a sprocket. Such power takeoff arrangement enables the distal end of the shaft to be coupled in driving relation with the multigroove pulley or sprocket in a universal manner, so as to be relatively free floating and self-aligning, and to transmit torque only. The universal connection embodies internal and external gear members with sufficient clearance, which when in complementary meshed relation, will give necessary clearance for proper alignment of the shaft without binding or misalignment thereof.

JACK W. MOSS
INVENTOR.

BY
Wayland D. Keith
HIS AGENT

POWER TAKEOFF WITH SHAFT FREE OF RADIAL LOAD

This invention relates to power takeoffs and more particularly to power takeoffs which have a radially supported transmission means to enable the use of a longer transmission means, as for instance, a multigroove V-belt sheave, a multiwidth chain sprocket, or the like.

Various power takeoffs have been proposed heretofore, but these, for the most part, transmit the radial load from the power transmitting means, such as a pulley or a sprocket, directly to the axle. However, with the present invention, the radial load is transmitted to a hollow supported housing through which hollow housing the transmission shaft extends, thereby enabling a smaller shaft to extend outward a greater distance but still transmit power to a heavy radial load supported on a housing without causing radial strain on the bearings in which the shaft is mounted.

An object of this invention is to provide a hollow, outwardly extending housing to permit a shaft to extend therethrough, so the housing will support an elongated, rotatable power transmission means in journaled relation on the housing.

Another object of the invention is to provide an elongated rotatable power transmitting means which is journaled on and supported solely by an outwardly extending housing with a drive shaft connected in universal relation with the rotatable power transmission means.

Still another object of the invention is to provide an elongated, rotatable power transmission means journaled wholly on a housing and which is connected in driving relation with a free floating shaft.

Still a further object of the invention is to provide an elongated, power transmitting pulley with spaced-apart radial bearings, intermediate the elongated rotatable pulley and the housing, with lubricant seals confining lubricant within the area surrounding the bearings.

Still a further object of the invention is to provide a power transmission means which is simple in construction, which will transmit a heavy load, and which is easy to make and low in the cost of manufacture.

With these objects in mind, and others which will become manifest as the description proceeds, reference is to be had to the accompanying drawings, in which like reference characters designate like parts in the several views thereof, in which:

FIG. 5 is an enlarged, fragmentary, sectional view, taken on line 5–5 of FIG. 1, to emphasize the clearance between the internal and external teeth of the drive and driven units of the shaft and pulley.

Figure 1:
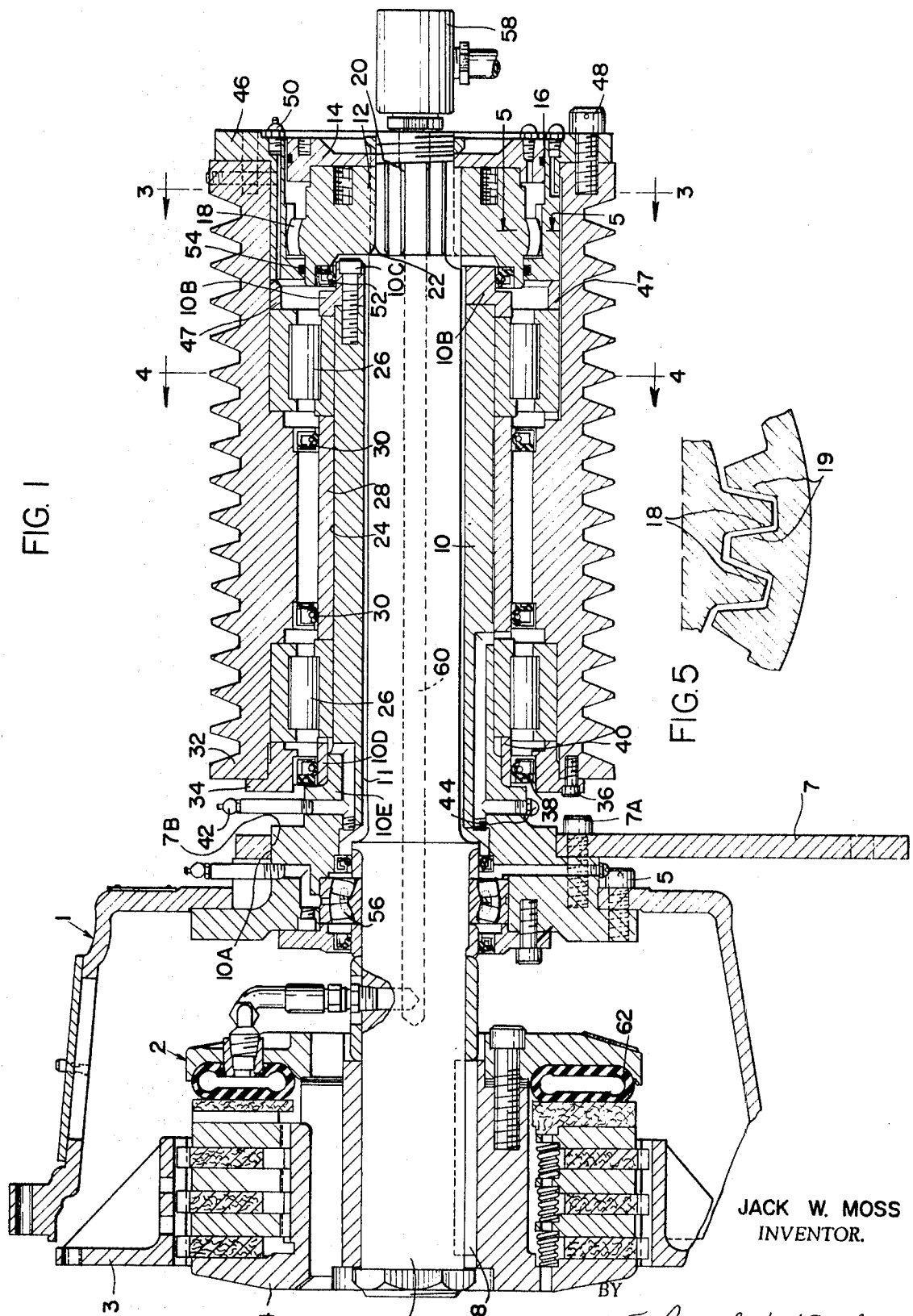
FIG. 1 is a longitudinal sectional view taken on the line 1–1 of FIG. 2, through a power transmission pulley, the pulley support housing, and the fluid actuated clutch and clutch housing, with parts broken away and shown in elevation to bring out the details of construction.
Figure 2:
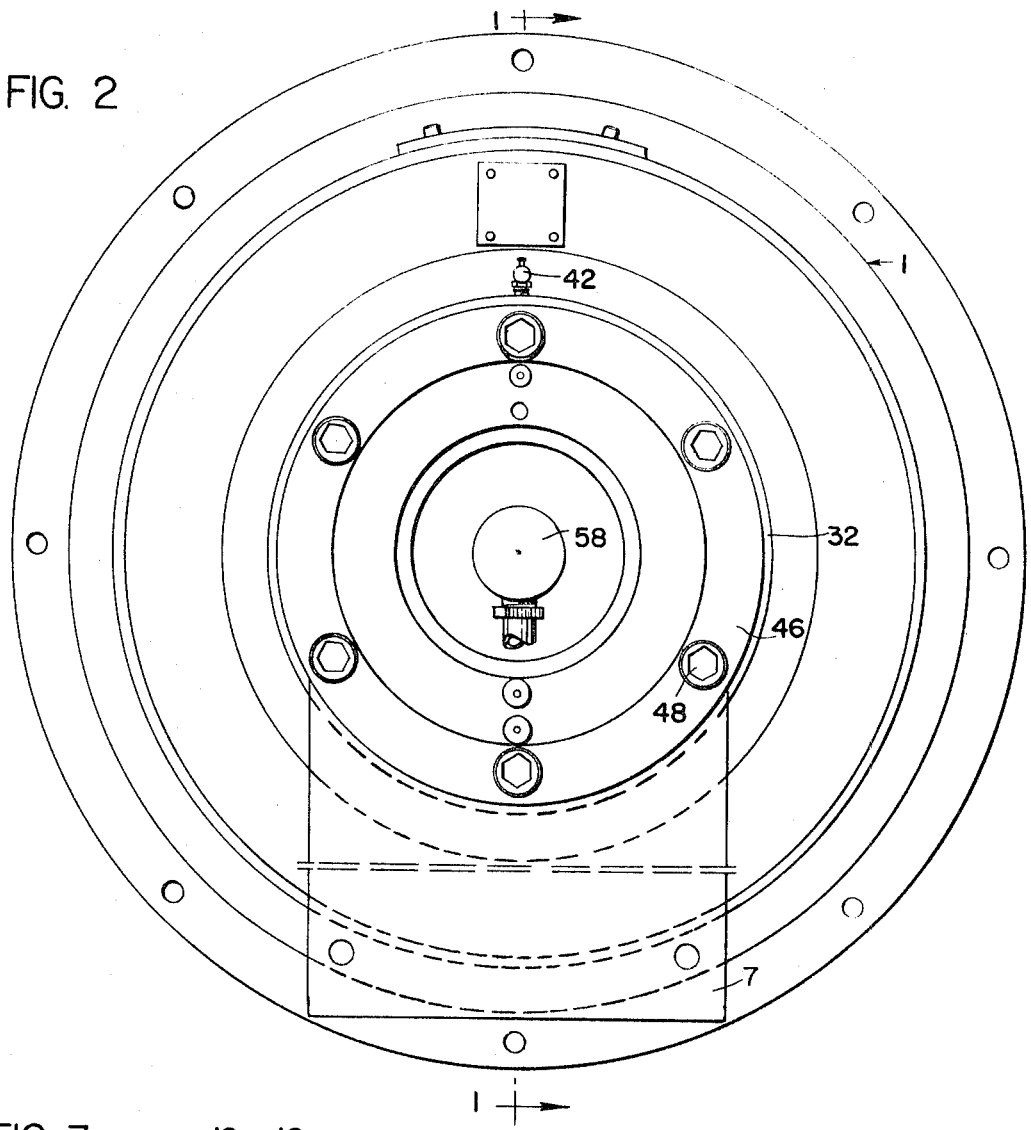
FIG. 2 is an end elevational view of a power takeoff unit, showing a portion of the clutch housing associated therewith.
Figure 3:
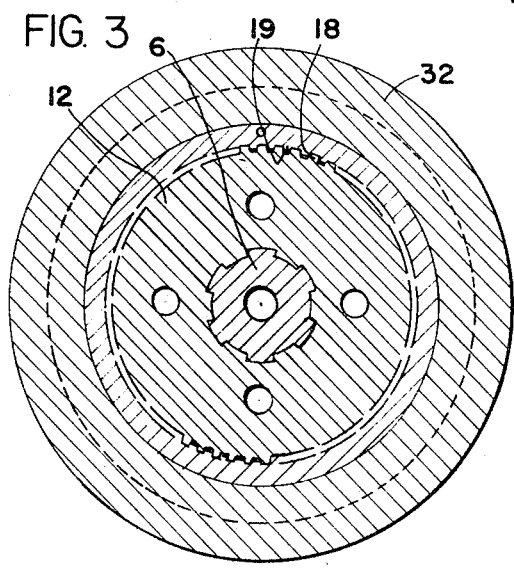
FIG. 3 is a sectional view taken on line 3–3 of FIG. 1, looking in the direction indicated by the arrows.
Figure 4:
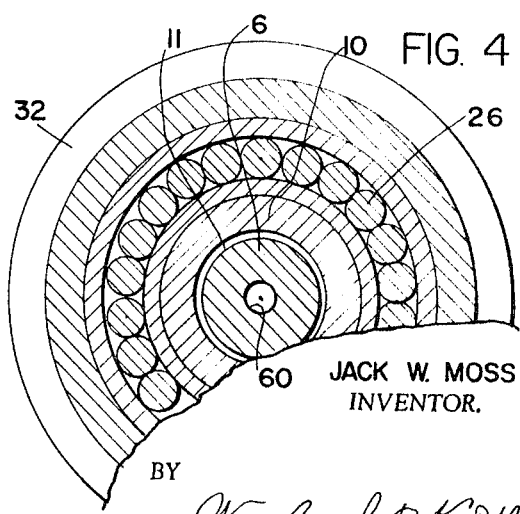
FIG. 4 is a sectional view taken on line 4–4 of FIG. 1, with a portion thereof being broken away.

With more detailed reference to the drawings, the numeral 1 designates generally a clutch housing, which clutch housing is shown to have a clutch therein, designated generally by the numeral 2, which is connected to the prime mover 3. In the present instance, the clutch is a fluid actuated clutch. The inner clutch member 4 has a power transmission shaft 6 fitted therein, which shaft is connected in driven relation with the clutch member 4 by a key 8. The shaft 6 is an elongated shaft which is shown to extend out through elongated hollow housing 10, which shaft 6 has a toothed gear member 12 keyed thereto for rotation therewith. The toothed gear member 12 forms a drive means and has a plate 14 surrounding the shaft outward from the toothed gear member 12, which plate 14 has an oil seal 16 therein to retain lubricant within a cavity which surrounds the teeth 18 of toothed gear member 12. The plate 14 is held in place by a screw-threaded nut 20 which bindingly engages the toothed gear member 12 against a shoulder 22 on shaft 6.

In addition to the hollow housing 10 being rigidly secured to the support housing 1 of the prime mover, which is usually a clutch housing, by bolts 5, a transverse brace means or plate 7 is secured to the housing 10 by bolts 7A, which transverse plate 7 has a hole 7B therein to fit in complementary relation with a shoulder 10A on the hollow housing 10, which transverse plate gives additional support to the hollow housing 10.

The hollow housing 10 is machined to form a cylindrical exterior surface 24 therearound, on which surface bearings 26 are fitted, which bearings are held in spaced-apart relation by a sleeve 28, which sleeve abuts against the inner faces of bearings 26 and which sleeve forms a surface for seals 30 to engage and to maintain the lubricant in and around bearings 26.

The hollow housing 10 has a cap 10B secured to the outer end thereof by bolts 10C, which bolts threadably engage the housing, when tightened, and urge the cap 10B, outer bearing 26, sleeve 28, inner bearing 26 and sleeve 10D and against shoulder 10E on housing 10 so as to maintain the bearings 26 in fixed relation with respect to housing 10.

A rotatable, elongated, power transmission means, such as an elongated, multigroove, V-belt sheave 32, is journaled on bearings 26 and has seals 30 within the bore thereof, which seals retain lubricant between sleeve 28 and the bore of the elongated, rotatable power transmission means 32. The inner end of the rotatable transmission means 32 has a cap 34 secured thereto by bolts 36, which cap, together with seal 38 and ring 40, form a seal to prevent escape of the lubricant, and to retain the inner bearing 26 in fixed relation within multigrooved, V-belt sheave 32.

A lubricant fitting 42 is provided in housing 10 to provide the inner bearings 26 with lubricant. A pressure relief valve 44 is connected with the opposite end of a passage in the housing to indicate when the bearing housing is filled with a lubricant. The opposite end of the rotatable power transmission means 32 has a cap 46 secured thereon in fluidtight relation by bolts 48. The cap 46 is secured to the outer end of V-belt sheave 32 by bolts 48 and has internal teeth 19 therein to complementally receive external longitudinally arcuate teeth 18 of the drive member 12, and since the teeth are in loose fitting relation, the shaft 6 is not subjected to bending moments. By having the internal teeth 19 within cap 46, the cap may be removed and replaced when the teeth become worn. The cap 46 further serves as an adjustment means to bear against ring 47, which in turn, bears against the race of the outer bearing 26 to maintain the bearing in fixed relation with V-belt sheave 32. A lubricant fitting 50 is provided therein for directing lubricant into a cavity surrounding the outer bearing 26. Seals 52 and 54 are provided at the outer end of the cavity of the outer bearing 26 to retain the lubricant therein, and the seal 30 is provided at the inner end of the outer bearing cavity.

The outwardly extending housing 10 has a bore 11 formed therein, which bore is substantially greater in diameter than the diameter of the shaft 6, so as to permit the centering of shaft 6 therein. This arrangement enables the power to be transmitted through teeth 18 of toothed gear member 12, from shaft 6 to internal teeth 19 within the cap member 46, which is on the outer end of rotatable power transmission means 32 to drive the power transmission means, with no appreciable radial load on shaft 6.

By having the bearings 26 positioned intermediate the housing 10, an elongated sheave 32 enables a greater load to be transmitted by a power unit, the shaft of which is normally a relatively short shaft, which usually requires that the load be near the bearing 56, however, with the present arrangement, greater horsepower may be transmitted to enable the full horsepower use of unit to be utilized, without exerting a radial load on shaft 6. The clutch 2 is shown to be supplied with air through a rotary fluid seal unit 58 which passes air through an axial opening 60 in shaft 6 to an expansible air tube member 62 in a conventional manner.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

I claim:

1. A power takeoff for a prime mover having an outwardly extending, non-load supporting, free floating power transmission shaft, which power takeoff comprises:
    a. a support housing on the prime mover;
    b. an elongated, hollow, load supporting housing rigidly secured to said support housing;
        1. the non-load supporting, free floating power transmission shaft of the prime mover extending into said elongated, hollow, load supporting housing,
    c. a hollow, cylindrical, elongated power transmission means;
        1. inner and outer, removable, complementary toothed drive means portions fitted within said hollow, cylindrical, elongated power transmission means near the distal end thereof;
        2. one portion of said toothed drive means being flanged to attach in fixed relation to said hollow, cylindrical, elongated transmission means, and being rotatable therewith,
        3. said teeth being longitudinally and circumferentially arranged internally of said flanged portion of said toothed drive means,
        4. the other portion of said toothed drive means having circumferentially spaced, longitudinally arcuate teeth around the exterior thereof to complementally engage said circumferentially spaced, longitudinally and circumferentially arranged teeth,
        5. said last mentioned portion of said toothed drive means having a bore formed therein to complementally receive said outwardly extending, non-load supporting, free floating power transmission shaft in fixed relation with respect thereto,
        6. said interengaging teeth of said drive means having sufficient clearance to enable said power transmission shaft to be free floating at all times, and
    d. bearings fitted intermediate said elongated, hollow, load supporting housing and said elongated, hollow, cylindrical power transmission means to rotatably support the load carried thereby in journaled relation on said elongated, hollow, load supporting housing.

2. A power takeoff for a prime mover, as defined in claim 1, wherein:
    a. the complementary drive means, near the outer end of the elongated power transmission means, is a detachable cap; and
    b. bolt means securing said detachable cap to the end of said elongated power transmission means.